United States Patent
Zhang et al.

(10) Patent No.: US 10,865,110 B2
(45) Date of Patent: Dec. 15, 2020

(54) COMPOSITIONS AND PROCESSES FOR REMOVING HEAVY METALS FROM PHOSPHORIC ACID SOLUTIONS

(71) Applicant: Cytec Industries Inc., Princeton, NJ (US)

(72) Inventors: Lei Zhang, Stamford, CT (US); Xueping Qiu, Stamford, CT (US); Rajesh Raitani, Buffalo Grove, IL (US)

(73) Assignee: Cytec Industries Inc., Princeton, NJ (US)

( * ) Notice: Subject to any disclaimer, the term of this patent is extended or adjusted under 35 U.S.C. 154(b) by 0 days.

(21) Appl. No.: 16/152,918

(22) Filed: Oct. 5, 2018

(65) Prior Publication Data
US 2019/0106324 A1    Apr. 11, 2019

Related U.S. Application Data

(60) Provisional application No. 62/569,590, filed on Oct. 8, 2017.

(51) Int. Cl.
*C01B 25/238* (2006.01)

(52) U.S. Cl.
CPC ........ *C01B 25/238* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 4,378,340 A | 3/1983 | Berglund | |
| 4,452,768 A | 6/1984 | Gradl et al. | |
| 4,479,924 A | 10/1984 | von Plessen et al. | |
| 4,503,016 A | 3/1985 | Schimmel et al. | |
| 4,684,459 A * | 8/1987 | Klimpel | B03D 1/01 209/166 |
| 4,713,229 A | 12/1987 | Schimmel et al. | |
| 4,986,970 A | 1/1991 | Haraldsen | |
| 5,279,806 A | 1/1994 | Becker | |
| 5,431,895 A | 7/1995 | Vermaire et al. | |
| 2004/0179984 A1 | 9/2004 | Nagaraj | |

FOREIGN PATENT DOCUMENTS

| | | |
|---|---|---|
| EP | 0333489 A2 | 9/1989 |
| EP | 0482160 A1 | 4/1992 |
| WO | 9100244 A1 | 1/1991 |
| WO | 9701649 A1 | 1/1997 |

OTHER PUBLICATIONS

International Search Report dated Apr. 18, 2019 for Int'l Application No. PCT/US2018/054578.

* cited by examiner

*Primary Examiner* — Melissa S Swain
(74) *Attorney, Agent, or Firm* — Charles E. Bell

(57) ABSTRACT

Processes for removing/recovering heavy metal ions in solutions containing phosphoric acid by adding reagents having at least one organothiophosphorus compound and at least one surfactant to the solution during the wet-process phosphoric acid production process to form heavy metal complexes, and separating the heavy metal complexes from the solution are provided herein.

22 Claims, 1 Drawing Sheet

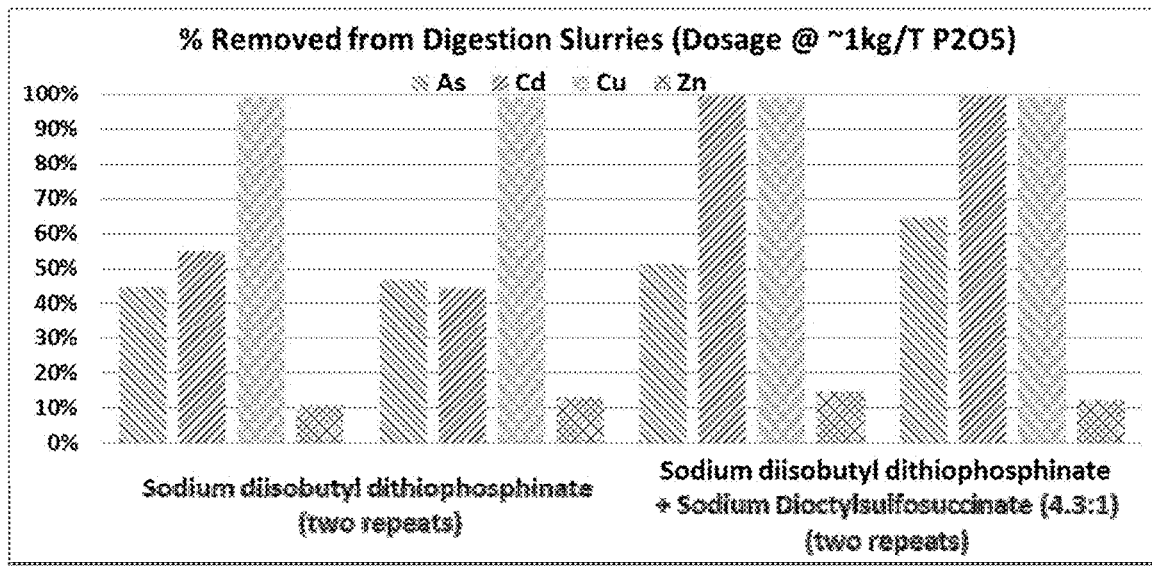

COMPOSITIONS AND PROCESSES FOR REMOVING HEAVY METALS FROM PHOSPHORIC ACID SOLUTIONS

CROSS-REFERENCE TO RELATED APPLICATIONS

This application claims benefit of priority to U.S. Provisional Application No. 62/569,590 filed on Oct. 8, 2017 (now expired), the content of which is incorporated herein by reference in its entirety.

BACKGROUND OF THE INVENTION

1. Field of the Invention

The present invention generally relates to purification in industrial process streams. More particularly, the present invention relates to removing heavy metal ions from phosphoric acid process streams.

2. Description of the Related Art

About 90% of the world's phosphoric acid is produced according to the wet process, which is conventionally prepared by acidulating phosphate rock (which contains calcium phosphate) with sulfuric acid to yield a crude wet-process phosphoric acid (WPA) and insoluble calcium sulfate (gypsum).

The manufacture of phosphoric acid is well known and is the subject of numerous textbooks. An overall view of the manufacture of phosphates and phosphoric acid is treated by Becker in *Phosphates and Phosphoric Acids*, Marcel Dekker, Inc. 1989; and by Stack in *Phosphoric Acid, Part 1 and Part 2*, Marcel Dekker, Inc. 1968. In the process, phosphate rocks are cleaned in the wash plant and ground in the Ball mill before being fed into a series of reactors for digestion with sulfuric acid along with recycled phosphoric acid from the process. After digestion, the reaction slurry is filtered to separate phosphoric acid from undissolved rocks, the newly formed gypsum, and the gangues. The filtered, crude WPA is then sent to clarifiers and evaporators for further purification and concentration. The purified phosphoric acid is either sent out as Merchant Grade Acid (MGA) or continued to make 69% $P_2O_5$ Super Phosphoric Acid (SPA), where it can be converted to many end products ranging from a chemical reagent, rust inhibitor, food additive, dental and orthopaedic etchant, electrolyte, flux, dispersing agent, industrial etchant, fertilizer feedstock, and component of home cleaning products. For example, crude phosphoric acid is concentrated to 54% ($P_2O_5$) before sent for Monoammonium Phosphate (MAP), Diammonium Phosphate (DAP), or ammonium phosphate-sulfate (APS) production.

During the production of phosphoric acid certain metal impurities in the form of heavy metal ions, such as cadmium, copper, arsenic, lead, and mercury, are present as minerals in the phosphate rock and are dissolved into the phosphoric acid. The metal impurities are considered unacceptable above a certain level, depending on the application of the phosphoric acid, because of their toxicity. Accordingly, the metal impurities have to be either completely removed or their levels have to be significantly reduced.

For example, cadmium (Cd) is toxic and can cause multiple issues to human being's health. Studies show that the major exposure of Cd to nonsmoking general population is through ingestion of contaminated food. Phosphate fertilizers have been identified as an important source that introduces Cd to the soil, which can be easily absorbed by agricultural plants and accumulated into the food chain ("Cadmium in phosphate fertilizers; ecological and economical aspects", CHEMIK 2014, 68, 10, 837-842).

Cd in phosphate fertilizer comes from phosphoric acid, the major raw material used to produce phosphate fertilizer. In fact, the majority of phosphoric acid production is used to produce fertilizer. Cd in phosphoric acid further stems from the phosphate bearing ores. Therefore, Cd can be removed either from the phosphate ore or from the phosphoric acid stream, with the latter being the focus of research in the past decades. Several categories of technologies to remove Cd from acid stream have been developed, including co-crystallization with anhydrite, precipitation with sulfide ions and organic sulfurous compounds, removal by solvent extraction, removal by ion exchange, removal by adsorbents, and separation by membrane technology ("Progress in the development of decadmiation of phosphorus fertilizers" Fertilizer Industry Federation of Australia, Inc., Conference "Fertilizers in Focus", 2001, 101-106).

U.S. Pat. No. 4,378,340 (1983) describes method of removing heavy metals, particularly cadmium, from wet process phosphoric acid through partial neutralization of acids with alkali, followed by precipitation with sulfide compounds. U.S. Pat. No. 5,431,895 (1995) also discloses using alkali solution and aqueous sulfide solution simultaneously with thorough mixing to remove lead and cadmium from phosphoric acid.

U.S. Pat. No. 4,986,970 (1991) discloses using metal salt of dithio carbonic acid-O-esters to precipitate the heavy metals, especially cadmium, from partially neutralized (pH 1.4-2) and pre-cooled (5-40° C.) phosphoric acid. Afterwards, the complexes can be separated from the acid using methods like flotation or filtration.

U.S. Pat. No. 4,452,768 (1984), U.S. Pat. No. 4,479,924 (1984), U.S. Pat. No. 4,713,229 (1987), and European Patent No. EP0333489 B1 (1989) describes methods of separating heavy metals, especially cadmium, mercury, and lead, from phosphoric acid using a diorganyldithiophosphoric acid ester and an adsorbent, a diorganyldithiophosphorus compound and an adsorbent, a diorganyldithiophosphoric acid ester and an adsorbent and a reductant, and a thioorganophosphine reagent and a reducing agent, respectively. U.S. Patent Publication No. 2004/0179984 also discloses methods of removing heavy metals from wet process phosphoric acid by adding a mixture reagents of diorgano dithiophosphinic acid (or alkali metal or ammonia salts thereof), a first dithiophosphoric acid (or alkali metal or ammonia salts thereof) with alkyl or alkylaryl or aralkyl moieties, and optionally a second diaryl dithiophosphoric acid (or alkali metal or ammonia salts thereof).

Several scientific publications ("Cadmium(II) extraction from phosphoric media by bis(2,4,4-trimethylpentyl) thiophosphinic acid (Cyanex 302)," Fluid Phase Equilibria 145 (1998) 301-310), and "Extraction of cadmium from phosphoric acid by trioctylphosphine oxide/kerosene solvent using factorial design," Periodica Polytechnic Chemical Engineering 55/2 (2011) 45-48)) discuss removal of Cadmium from phosphoric acid based on solvent extraction method using reagents such as bis(2,4,4-trimethylpentyl) thiophosphinic acid/kerosene, and trioctylphosphine oxide/kerosene, respectively.

However, while the various reagents and approaches discussed above may have some merits and applicability in phosphoric acid production, the high investment cost, high treatment cost, and low efficacy are limiting their wide acceptance at the plant scale (See "Cadmium in phosphate fertilizers; ecological and economical aspects", CHEMIK 2014, 68, 10, 837-842). Heavy metal contamination of food, especially cadmium that stems from use of phosphoric acid in fertilizer production, continues to be a concern to public health. The economic impact for the issue of heavy metal is substantial, and the industry is in need of a more efficient and economical technology than that which currently exists. Additionally, there has been a recent regulatory push to further limit the Cd level in phosphate fertilizers (See European Commission Fact Sheet. "Circular economy: New Regulation to boost the use of organic and waste-based fertilisers." EU MEMO-16-826, 17 Mar. 2016, europa.eu/rapid/press-release_MEMO-16-826_en.htm).

Accordingly, the compositions and methods presently available for heavy metal removal from phosphoric acid in the production process require further improvement. Since many factors (e.g., ore type, temperature, agitation, reactor design, acid chemistry, foreign ions, organic species, and viscosity of phosphoric acid medium) can affect the performance of reagents, it is a great challenge to develop high-efficiency reagents useful for removing heavy metals from phosphoric acid. Successful reagents for removing heavy metals in industrial process streams such as wet process phosphoric acid would be a useful advance in the art and could find rapid acceptance in the industry.

SUMMARY OF THE INVENTION

The forgoing and additional objects are attained in accordance with the principles of the invention wherein the inventors detail the surprising discovery that organothiophosphorus compounds and surfactants, such as sulfosuccinate compounds and polyethyleneglycol esters, are effective for removing heavy metal ions from aqueous solutions containing phosphoric acid. Accordingly, the processes for removing heavy metal ions according to various embodiments of the present invention as described herein below are applicable for use with the various stages of wet process phosphoric acid production.

Accordingly, in one aspect the present invention provides processes for removing heavy metal ions from a solution containing phosphoric acid by adding an effective amount of a reagent including an organothiophosphorus compound and a surfactant to the solution to form heavy metal complexes and separating the heavy metal complexes from the solution.

In the same or additional embodiments, the process can further include adding an effective amount of a reducing agent to the solution containing phosphoric acid.

In the same or additional embodiments, the process can further include adding an effective amount of an adsorbent to the solution containing phosphoric acid.

This summary of the invention does not list all necessary characteristics and, therefore, subcombinations of these characteristics or elements may also constitute an invention. Accordingly, these and other objects, features and advantages of this invention will become apparent from the following detailed description of the various embodiments of the invention taken in conjunction with the accompanying Figures and Examples.

BRIEF DESCRIPTION OF THE DRAWINGS

FIG. 1 is a graph illustrating the results of Examples 3B-1 and 3B-2 compared to Example 3C-1 and 3C-2, wherein the ratio of heavy metal removed from the digestion slurries of phosphoric acid at ~60° C. with dosage of reagents at ~1 kg/T $P_2O_5$ level.

DETAILED DESCRIPTION OF CERTAIN EMBODIMENTS OF THE INVENTION

The present invention generally relates to purification of solutions in industrial process streams. More particularly, the inventors describe herein for the first time processes for removing and/or recovering heavy metal ions from solutions containing phosphoric acid by adding an effective amount of an organothiophosphorus compound and a surfactant thereto to form a heavy metal complex, and separating the complex from the solution. The compositions and processes described herein provide improvement and/or an unexpected advantage when compared to the prior art processes and compositions.

As employed throughout the disclosure of the invention, the following terms are provided to assist the reader. Unless otherwise defined, all terms of art, notations and other scientific or industrial terms or terminology used herein are intended to have the meanings commonly understood by those of skill in the chemical and/or phosphoric acid production arts. In some cases, terms with commonly understood meanings are defined herein for clarity and/or for ready reference, and the inclusion of such definitions herein should not necessarily be construed to represent a substantial difference over the definition of the term as generally understood in the art unless otherwise indicated. As used herein and in the appended claims, the singular forms include plural referents unless the context clearly dictates otherwise. Throughout this specification, the terms retain their definitions.

As used herein with reference to the present invention, the term "heavy metal" or "metal" shall refer to those elements of the periodic table having a density of more than 5 g/cm$^3$ and an oxidation state higher than 0, (i.e., heavy metal ions). Such heavy metal ions include, for example, one or more of copper, cadmium, nickel, mercury, zinc, arsenic, manganese and lead. In any or all embodiments, cadmium ions are removed from solutions containing phosphoric acid.

The concept of "heavy metal complex" refers to compounds formed by reacting heavy metal ions with chelating agents. Heavy metal complexes can be solid, waxy, or oily in the phosphoric acid solutions. They can precipitate, float, or suspend in the phosphoric acid solutions.

Those skilled in the art will understand that reference to "phosphoric acid solutions," or "solutions containing phosphoric acid," in the context of the invention includes any aqueous acidic solution containing crude phosphoric acid, digestion slurries, filtered acid, and/or concentrated acid.

"Effective amount" means the dosage of any reagents on an active basis (such as the compositions including organothiophosphorus and surfactant compounds described herein) necessary to provide the desired performance in the phosphoric acid system or circuit being treated (such as the formation of heavy metal complexes) when compared to an untreated control system or system using a reagent product of the prior art.

As used herein, the term "alkyl" is intended to include linear, branched, or cyclic hydrocarbon structures and combinations thereof. Preferred alkyl groups are those of $C_{30}$ or below. Lower alkyl refers to alkyl groups of from 1 to 6 carbon atoms. Examples of lower alkyl groups include methyl, ethyl, propyl, isopropyl, butyl, s- and t-butyl, pentyl, hexyl and the like. Cycloalkyl is a subset of alkyl and includes cyclic hydrocarbon groups having from 3 to 30 carbon atoms, preferably from 3 to 8 carbon atoms as well as polycyclic hydrocarbons having 7 to 10 carbon atoms.

The term "aryl" as used herein refers to cyclic aromatic hydrocarbons that do not contain heteroatoms in the ring. In any or all embodiments, aryl groups contain about 6 to about 14 carbons in the ring portions of the groups. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those known to persons of skill in the art. Aryl groups of $C_6$-$C_{12}$ are preferred.

The term "alkaryl" as used herein is a broad term and is used in its ordinary sense, including, without limitation, to refer to an aryl having at least one aryl hydrogen atom replaced with an alkyl moiety. The term "aralkyl" as used herein is a broad term and is used in its ordinary sense, including, without limitation, to refer to an alkyl having at least one alkyl hydrogen atom replaced with an aryl moiety, such as benzyl, —$CH_2$(1 or 2-naphthyl), —$(CH_2)_2$phenyl, —$(CH_2)_3$phenyl, —CH(phenyl)$_2$, and the like. Particularly preferred are $C_{7-20}$ aralkyl groups.

The terms "comprised of," "comprising," or "comprises" as used herein includes embodiments "consisting essentially of" or "consisting of" the listed elements, and the terms "including" or "having" in context of describing the invention should be equated with "comprising".

Those skilled in the art will appreciate that while preferred embodiments are discussed in more detail below, multiple embodiments of the reagent system and processes described herein are contemplated as being within the scope of the present invention. Thus, it should be noted that any feature described with respect to one aspect or one embodiment of the invention is interchangeable and/or combinable with another aspect or embodiment of the invention unless otherwise stated.

Furthermore, for purposes of describing the present invention, where an element, component, or feature is said to be included in and/or selected from a list of recited elements, components, or features, those skilled in the art will appreciate that in the related embodiments of the invention described herein, the element, component, or feature can also be any one of the individual recited elements, components, or features, or can also be selected from a group consisting of any two or more of the explicitly listed elements, components, or features. Additionally, any element, component, or feature recited in such a list may also be omitted from such list.

Those skilled in the art will further understand that any recitation herein of a numerical range by endpoints includes all numbers subsumed within the recited range (including fractions), whether explicitly recited or not, as well as the endpoints of the range and equivalents. The term "et seq." is sometimes used to denote the numbers subsumed within the recited range without explicitly reciting all the numbers, and should be considered a full disclosure of all the numbers in the range. Disclosure of a narrower range or more specific group in addition to a broader range or larger group is not a disclaimer of the broader range or larger group.

Organothiophosphorus compounds described herein for any or all embodiments include any organophosphorus compound wherein at least one of the oxygen atoms in the phosphate/phosphonate/phosphinate moiety is replaced by a sulfur atom. In the same or alternate embodiments, the organothiophosphorus compounds are selected from the group consisting of organodithiophosphinic acid; organodithiophosphonic acid; organodithiophosphoric acid; organomonothiophosphinic acid; organomonothiophosphinic acid; organomonothiophosphoric acid; and their corresponding alkalai metal (e.g., calcium, potassium, sodium) or ammonium salts; and mixtures thereof.

In the same or alternate embodiments the organodithiophosphorus compound is selected from the group consisting of diisobutyl dithiophosphinate; bis(2,4,4-trimethylpentyl) dithiophosphinic acid; diisobutyl dithiophosphate; dicresyl dithiophosphoric acid; dicresyl monothiophosphate; di(sec-butyl) dithiophosphate; their corresponding metal alkalai metal or ammonium salts; and mixtures thereof. Preferably the organothiophosphorus compounds include mixtures of organodithiophosphinic acid, organodithiophosphoric acid, and their alkalai metal or ammonium salts. In the same or alternate embodiments, the organodithiophosphinic acid is a corresponding alkalai metal salt and is sodium diisobutyl dithiophosphinate; and the organodithiophosphoric acid is a corresponding alkalai metal salt and is sodium diisobutyl dithiophosphate.

In any or all embodiments the surfactant compound can be selected from the group consisting of sulfosuccinates; arylsulfonates; alkarylsulfonates; diphenyl sulfonates; olefin sulfonates; sulfonates of ethoxylated alcohols; petroleum sulfonates; sulfosuccinamates; alkoxylated surfactants; ester/amide surfactants; EO/PO block copolymers; and mixtures thereof. In a preferred embodiment, the surfactant can be a sulfosuccinate. In the same or alternate embodiment, the sulfosuccinate can be sodium dioctylsulfosuccinate. Suitable sodium dioctylsulfosuccinate compounds include, but are not limited to, AEROSOL® OT-70 and DHAY-SULF® 70B available from Solvay S.A. Suitable alkoxylated surfactants can include, but are not limited to, polyethyleneglycol sorbitan monooleate (such as TWEEN® 80 available from Croda), and polyethyleneglycol sorbitol hexaoleate (such as ATLAS® G1086 available from Croda).

In any or all embodiments of the invention, the organothiophosphorus compound and surfactant can be added to either the crude acid or digestion slurries prior to gypsum filtration, or to the filtered acid or the concentrated acid to complex the heavy metals. Afterwards, heavy metal complexes can be separated from the acid or slurry. In any or all embodiments, the methods of separation include, but are not limited to, filtration, centrifugation, sedimentation, creaming, flocculation, adsorption, and/or flotation.

In any or all embodiments of the invention, the organothiophosphorus compound and surfactant can be added to the solution containing phosphoric acid all in one stage or added in several stages. In the same or other embodiments, the organothiophosphorus compound and surfactant can be added as a blend, or separately in any order such as concurrently together or sequentially. Treatment times in any or all embodiments of the invention can be from a few seconds (i.e., 5 to 10 seconds) to 60 minutes. In those instances where the reagent complexes the heavy metals very rapidly, the preferred treatment times are from about 5 seconds to 5 minutes. Most typically, the treatment times are from 10 seconds to 60 seconds or 120 seconds.

The dosage of the reagent for complexing heavy metals and removal efficiency for the various heavy metals will depend on the amount of heavy metal impurities present in the ore and/or solution containing phosphoric acid. Generally, the greater number of heavy metals present and the higher their concentrations, the greater will be the overall dosage of the reagent. Those skilled in the art will be able to readily determine and establish the optimum dosage of organothiophosphorus compounds and surfactants required using no more than routine experimentation. Generally, the dosages may be in the range of from 0.01 to 50 kg (e.g., 0.01, 0.02, 0.03, 0.04, 0.05, et seq. to 0.10, 0.15, 0.20, 0.25, 0.30, et seq. to 1.0, 1.5, 2.0, 2.5, 3.0, 3.5, 4.0, 4.5, 5.0, et seq. to 10, 15, 20, 25, 30, 35, 40, 45, 50 kg) reagent per ton of $P_2O_5$ of the phosphoric acid solution, based on the type of heavy metal ions to be removed. Most typically, the dosages can be from 0.1 kg to 10 kg (e.g., 0.10, 0.15, 0.20, 0.25, 0.30, et seq. to 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, and 10 kg) of reagent per ton of $P_2O_5$. It will be understood by those ordinarily skilled in the art that any of the recited dosages (except the lowest dosage point) can also be recited as "less than" a particular dosage, e.g., less than 50 kg; or that any of the recited dosages (except the highest dosage point) can also be recited as "greater than" a particular dosage, e.g., greater than 0.10 kg.

The ratio of organodithiophosphorus compound to surfactant is from 1 to 2 to 99 to 1. In any or all embodiments, the ratio of organodithiophosphorus compound to surfactant is from 2:1 or from 20:1. In the same or alternate embodiments, the ratio of a mixture of two or more organodithiophosphorus compounds is 1:1. Accordingly, the ratio of organodithiophosphorus compounds to surfactant can be from 1:1:4 to 50:50:1.

In any or all embodiments, the solution containing phosphoric acid has a $P_2O_5$ concentration from 20 wt. % to 60 wt. %. Specific concentration of $P_2O_5$ contemplated for use with the invention include 28 wt. %, 30 wt. %, 42 wt. %, 44 wt. %, 52 wt. %, and 56 wt. %.

The compositions and processes described herewith as the present invention can be used over a wide temperature range. In any or all embodiments, for example, the processes according to the invention can be performed at a temperature from 0° C. to 120° C. Preferably, the temperature is in the range from 20° C. to 80° C.

In any or all of the embodiments according to the present invention, the process can further include adding an effective amount of a reducing agent and/or an adsorbent to the solution containing phosphoric acid. Such agents are known to be useful in the field. In certain circumstances one or both of these agents can enhance the activity of the reagent including the organodithiophosphorus compound and surfactant. In the same or alternate embodiments, the reducing and/or adsorbent agent can be added to the solution containing phosphoric acid all in one stage or added in several stages. In the same or other embodiments, the reducing and/or adsorbent agent can be added together as a blend with the reagent including the organothiophosphorus compound and surfactant, or separately in any order with the organothiophosphorus compound and surfactant such as concurrently together or sequentially. While the nature and quantity of the reducing and/or adsorbent agents used depends on the particular composition of the phosphoric acid in the solution, and of the purity specifications, those skilled in the art will be able to determine the optimum dosage range using no more than routine experimentation.

Reducing agents useful in any or all processes according to the invention include, but are not limited to, iron powder, zinc, red phosphorus, iron (II) sulfate, sodium hypophosphite, hydrazine, hydroxymethane sulfonate, and mixtures thereof. In preferred embodiments, the reducing agent includes sodium hypophosphite. In any or all embodiments, the reducing agent is used in an amount from 0.01 kg to 50 kg of reagent per ton of $P_2O_5$, based on the type and quantity of the oxidants in the phosphoric acid solution, which can be readily determined by those skilled in the art using no more than routine methods. In preferred embodiments, the amount of reducing agent is from 0.1 kg to 5 kg of reagent per ton of $P_2O_5$ of the phosphoric acid solution.

Adsorbent agents useful in any or all embodiments according to the invention include all those substances that are capable of adsorbing at their surface a sufficiently large quantity of organothiophosphorus compounds such that the quantity of reagent retained in the phosphoric acid after removal/recovery of the heavy metals therefrom is practically zero. Such compounds include, but are not limited to, active charcoal/carbon, carbon black, ground lignite, adsorbents containing silicate (e.g., synthetic silicic acids, zeolites, calcium silicate, bentonite, perlite, diatomaceous earth, and fluorosilicate), calcium sulfate (including gypsum, hemihydrate, and anhydride), and mixtures thereof. In any or all embodiments, the adsorbent is present in an amount from 0.05 wt. % to 50 wt. %, and preferably from 0.1 wt. % to 5 wt. %, based on the quantity of phosphoric acid in the solution.

While various embodiments may have been described herein in singular fashion, those skilled in the art will recognize that any of the embodiments described herein can be combined in the collective. The invention includes at least the following embodiments:

Embodiment 1

A process for removing heavy metal ions from a solution containing phosphoric acid comprising adding an effective amount of a reagent comprising an organothiophosphorus compound and a surfactant to the solution to form heavy metal complexes, and separating the heavy metal complexes from the solution.

Embodiment 2

A process according to embodiment 1, wherein said heavy metal ions are selected from the group consisting of cadmium, copper, arsenic, mercury, lead, and mixtures thereof.

Embodiment 3

A process according to embodiment 1 or embodiment 2, wherein said heavy metal ion is cadmium.

Embodiment 4

A process according to embodiment 1, wherein said organothiophosphorus compound is selected from the group consisting of organodithiophosphinic acid, organodithiophosphonic acid, organodithiophosphoric acid, organomonothiophosphinic acid, organomonothiophosphonic acid, organomonothiophosphoric acid, and their salts in the form of sodium, ammonium, or potassium, and mixtures thereof.

Embodiment 5

A process according to embodiment 4, wherein said organothiophosphorus compound comprises mixtures of organodithiophosphinic acid, organodithiophosphoric acid, and their salts in the form of sodium, ammonium, or potassium.

Embodiment 6

A process according to embodiment 4 or embodiment 5, wherein said organodithiophosphinic compound is sodium diisobutyl dithiophosphinate.

Embodiment 7

A process according to embodiment 4 or embodiment 5, wherein said organodithiophosphoric compound is sodium diisobutyl dithiophosphate.

Embodiment 8

A process according to any one of embodiments 1 to 7, wherein said surfactant is selected from the group consisting of sulfosuccinates, arylsulfonates, alkyarylsulfonates, diphenyl sulfonates, olefin sulfonates, sulfonates of ethoxylated alcohols, petroleum sulfonates, sulfosuccinamates, alkoxylated surfactants, ester/amide surfactants, EO/PO block copolymers, and mixtures thereof.

Embodiment 9

A process according to embodiment 8, wherein said surfactant is a sulfosuccinate.

Embodiment 10

A process according to embodiment 9, wherein said sulfosuccinate compound is sodium dioctylsulfosuccinate.

Embodiment 11

A process according to embodiment 8, wherein the surfactant is polyethyleneglycol ester.

Embodiment 12

A process according to embodiment 11, wherein the polyethyleneglycol ester surfactant is chosen from polyethyleneglycol sorbitan monooleate or polyethyleneglycol sorbitol hexaoleate.

Embodiment 13

A process according to any one of embodiments 1 to 12, where in the process is performed at a temperature from 0° C. to 120° C.

Embodiment 14

A process according to any one of embodiments 1 to 13, wherein the solution containing phosphoric acid has a concentration from 20% to 64% $P_2O_5$.

Embodiment 15

A process according to any one of embodiments 1 to 14 further comprising adding an effective amount of a reducing agent to the solution.

Embodiment 16

A process according to embodiment 15, wherein said reducing agent is added prior to or together with the addition of the reagent.

Embodiment 17

A process according to embodiment 15 or embodiment 16, wherein said reducing agent is selected from the group consisting of sodium hypophosphite, hydrazine, iron (II) sulfate, iron powder, and mixtures thereof.

Embodiment 18

A process according to embodiment 17, wherein said reducing agent is sodium hypophosphite.

Embodiment 19

A process according to any one of embodiments 1 to 18 further comprising adding an effective amount of an adsorbent to the solution.

Embodiment 20

A process according to embodiment 19, wherein said adsorbent is selected from the group consisting of calcium sulfate, fluorosilicate, activated carbon, and mixtures thereof.

Embodiment 21

A process according to embodiment 20, wherein said adsorbent is calcium sulfate particles.

Embodiment 22

A process according to any one of embodiments 1 to 21, wherein the process further comprises the step of filtering the solution containing phosphoric acid prior to adding the reagent.

The following examples are provided to assist one skilled in the art to further understand certain embodiments of the present invention. These examples are intended for illustration purposes and should not be construed as limiting the scope of the present invention.

The performances of various blends of organothiophosphorus compounds and surfactants, such as dialkyl sulfosuccinates compounds and polyethyleneglycol esters, to complex heavy metals for removal are evaluated with phosphoric acid and phosphoric acid slurries. The phosphoric acids with different $P_2O_5$ levels are obtained from plants. The phosphoric acid slurries are generated with a bench-scale digestion process. To separate the heavy metal complexes from the acid, either a syringe filter or a vacuum filtration is used. Afterwards, the filtrate acids are analyzed with ICP (Inductively Coupled Plasma) to determine the level of various heavy metal elements. The general procedure for the test and experimental examples are outlined below.

Example 1

Process for removing heavy metals from plant phosphoric acids (~30% $P_2O_5$) at room temperature (~20° C.).

60 g of plant phosphoric acid (~30% $P_2O_5$, collected from the clarification tank after filtration) is transferred into a glass jar with a magnetic stir bar. An effective amount (as listed in Table 1) of a reagent of interest is dosed into slurry under agitation at 600 rpm. After agitation for 10 minutes, the acid is transferred into a syringe and filtered with a 0.2 µm nylon syringe filter. The filtrate is collected and then submitted for ICP elemental analysis. The results are shown in Table 1.

TABLE 1

| Example | Reagents | Dosage (kg/T P2O5) | As (ppm) | Cd (ppm) | Cu (ppm) | Fe (ppm) | Zn (ppm) | Percentage of metal removed | | | | |
|---|---|---|---|---|---|---|---|---|---|---|---|---|
| | | | | | | | | As | Cd | Cu | Fe | Zn |
| 1A | Blank | — | 7 | 95 | 41 | 3960 | 1203 | — | — | — | — | — |
| 1B | Sodium Dioctylsulfosuccinate[a] | 7 | 7.3 | 86 | 38 | 3680 | 1100 | −4% | 9% | 7% | 7% | 9% |
| 1C-1 | Sodium diisobutyl dithiophosphinate[b] | 5 | 6.5 | 62 | 18.9 | 3650 | 1000 | 7% | 35% | 54% | 8% | 17% |
| 1C-2 | Sodium diisobutyl dithiophosphinate + Sodium Dioctylsulfosuccinate (4.3:1) | 4.3 + 1 | 6 | 33 | 3.6 | 3660 | 994 | 14% | 65% | 91% | 8% | 17% |
| 1C-3 | Sodium diisobutyl dithiophosphinate + Sodium Dioctylsulfosuccinate (2.1:1) | 3.8 + 1.8 | 6.4 | 33 | 4.2 | 3613 | 998 | 9% | 65% | 90% | 9% | 17% |
| 1D-1 | Bis(2,4,4-trimethylpentyl) dithiophosphinic acid[c] | 8.5 | 6.5 | 32 | 12 | 3690 | 1004 | 7% | 66% | 71% | 7% | 17% |
| 1D-2 | Bis(2,4,4-trimethylpentyl) dithiophosphinic acid + Sodium Dioctylsulfosuccinate (7.3:1) | 7.3 + 1 | 6.7 | 3.3 | 3.9 | 3750 | 1043 | 4% | 97% | 90% | 5% | 13% |
| 1E-1 | Sodium diisobutyl dithiophosphate | 5 | 6.8 | 64 | 18 | 3845 | 1063 | 3% | 33% | 56% | 3% | 12% |
| 1E-2 | Sodium diisobutyl dithiophosphate + Sodium Dioctylsulfosuccinate (4.3:1) | 4.3 + 1 | 5.8 | 26 | 0.3 | 3425 | 980 | 17% | 73% | 99% | 14% | 19% |
| 1F-1 | Dicresyl dithiophosphoric acid[d] | 8.5 | 7.4 | 63 | 18 | 4055 | 1092 | −6% | 34% | 56% | −2% | 9% |
| 1F-2 | Dicresyl dithiophosphoric acid + Sodium Dioctylsulfosuccinate (7.3:1) | 7.3 + 1 | 6.4 | 47 | 4.9 | 3730 | 1030 | 9% | 51% | 88% | 6% | 14% |
| 1G-1 | Sodium dicresyl monothiophosphate[e] | 5 | — | 40 | 21 | — | — | — | 58% | 48% | — | — |
| 1G-2 | Sodium dicresyl monothiophosphate + Sodium Dioctylsulfosuccinate (4.3:1) | 4.3 + 1 | — | 35 | 18 | — | — | — | 63% | 56% | — | — |
| 1H-1 | Sodium diisobutyl dithiophosphinate + Sodium diisobutyl dithiophosphate (1:1) | 2.5 + 2.5 | 6.3 | 43 | 5.3 | — | — | 10% | 54% | 72% | — | — |
| 1H-2 | Sodium diisobutyl dithiophosphinate + Sodium diisobutyl dithiophosphate + Sodium Dioctylsulfosuccinate (2.1:2.1:1) | 2.1 + 2.1 + 1 | 6.9 | 27 | 0.5 | — | — | 1% | 87% | 99% | — | — |

[a,b,c,d, and e] obtained from Solvay S. A.

As shown in Table 1, while dialkyl sulfosuccinate compounds (Example 1B) show little or no efficacy of removing heavy metals from phosphoric acid or phosphoric acid slurry, and organothiophosphorus compounds (Examples 1C-1; 1D-1; 1E-1; 1F-1; 1G-1; and 1H-1) show some performance, the efficacy of heavy metal removal from solutions containing phosphoric acid is greatly improved by adding a reagent according to the invention (Examples 1C-2; 1C-3; 1D-2; 1E-2; 1F-2; 1G-2; and 1H-2) having at least one organothiophosphorus compound and at least one surfactant (dialkyl sulfosuccinate compound). Additionally, the dosage of reagents can be reduced and the process can be made more economical.

Unexpectedly, the selectivity of removal of certain metal, especially Cd and Cu, is shown to be greatly enhanced. The superior performance in selectivity of Cd removal is quite unusual and would be very much desired by phosphoric acid producers in view of recent regulations that have been mainly focused on reducing levels of Cd.

Example 2

Process for removing heavy metals from plant phosphoric acids (~30% $P_2O_5$) at elevated temperature (~70° C. to 80° C.).

30 g of plant phosphoric acid from plant #1, #2, #3, or #4 (~30% $P_2O_5$, collected from the clarification tank after filtration) is transferred into a glass jar with a magnetic stir bar. The acid is heated to 70° C. to 80° C. on a hot plate. An effective amount (as listed in Table 2) of a reagent of interest is dosed into slurry under agitation at 600 rpm. After agitation for 1 minute, the acid is transferred into a syringe and filtered with a 0.2 μm nylon syringe filter. The filtrate is collected and then submitted for ICP elemental analysis. The results are shown in Table 2.

TABLE 2

| Example | Plant phosphoric acid (~30% $P_2O_5$) | Temp. (° C.) | Reagents | Dosage (kg/T $P_2O_5$) | As (ppm) | Cd (ppm) | Cu (ppm) | Percentage of metal removed As | Cd | Cu |
|---|---|---|---|---|---|---|---|---|---|---|
| 2A | #1 | ~70 | Blank #1 | — | 10.4 | 116 | 50 | — | — | — |
| 2B-1 | #1 | ~70 | Sodium di(sec-butyl) dithiophosphate[a] | 5 | 9.7 | 54 | 18 | 7% | 53% | 64% |
| 2B-2 | #1 | ~70 | Sodium di(sec-butyl) dithiophosphate + Sodium Dioctylsulfosuccinate (4.3:1) | 4.3 + 1 | 8.8 | 2.3 | 0 | 15% | 98% | 100% |
| 2C | #2 | ~80 | Blank #2 | — | 3.2 | 44 | 20 | — | — | — |
| 2D-1 | #2 | ~80 | Diisooctylthiophosphinic acid[b] | 4.2 | 3.7 | 41 | 21 | −16% | 7% | −5% |
| 2D-2 | #2 | ~80 | Diisooctylthiophosphinic acid + Sodium Dioctylsulfosuccinate (7.3:1) | 3.7 + 0.5 | 3.4 | 35 | 21 | −6% | 20% | −5% |
| 2E | #3 | ~75 | Blank #3 | — | 5.6 | 39 | 22 | — | — | — |
| 2F-1 | #3 | ~75 | Sodium diisobutyl dithiophosphinate | 2.5 | 5.3 | 23 | 5.9 | 5% | 41% | 73% |
| 2F-2 | #3 | ~75 | Sodium diisobutyl dithiophosphinate + Sodium Dioctylsulfosuccinate (93:7) | 2.3 + 0.2 | 5.1 | 10 | 0.5 | 9% | 74% | 98% |
| 2F-3 | #3 | ~75 | Sodium diisobutyl dithiophosphinate + Sodium Dioctylsulfosuccinate (87:13) | 2.1 + 0.4 | 5 | 10 | 0.5 | 11% | 74% | 98% |
| 2F-4 | #3 | ~75 | Sodium diisobutyl dithiophosphinate + Sodium Dioctylsulfosuccinate (81:19) | 2 + 0.7 | 5.1 | 12 | 0.5 | 9% | 69% | 98% |
| 2F-5 | #3 | ~75 | Sodium diisobutyl dithiophosphinate + Sodium Dioctylsulfosuccinate (74:26) | 1.8 + 0.9 | 5 | 6 | 0.5 | 11% | 85% | 98% |
| 2F-6 | #3 | ~75 | Sodium diisobutyl dithiophosphinate + Sodium Dioctylsulfosuccinate (68:32) | 1.7 + 1.1 | 5 | 16 | 0.5 | 11% | 59% | 98% |
| 2F-7 | #3 | ~75 | Sodium diisobutyl dithiophosphinate + Sodium Dioctylsulfosuccinate (59:41) | 1.5 + 1.4 | 5.3 | 23 | 2.5 | 5% | 41% | 89% |
| 2F-8 | #3 | ~75 | Sodium diisobutyl dithiophosphinate + Sodium Dioctylsulfosuccinate (42:58) | 1 + 2 | 5 | 26 | 2.6 | 11% | 33% | 88% |
| 2F-9 | #3 | ~75 | Sodium diisobutyl dithiophosphinate + Sodium Dioctylsulfosuccinate (26:74) | 0.6 + 2.5 | 5.3 | 30 | 4 | 5% | 23% | 82% |
| 2F-10 | #3 | ~75 | Sodium Dioctylsulfosuccinate | 3.5 | 5 | 35 | 20 | 11% | 10% | 9% |
| 2G | #3 | ~75 | Sodium diisobutyl dithiophosphate | 2.5 | 4.8 | 18 | 6.2 | 14% | 54% | 72% |
| 2H | #3 | ~75 | TWEEN ® 80[c] | 5 | 5.5 | 39 | 20 | 2% | 0% | 9% |
| 2I-1 | #3 | ~75 | Sodium diisobutyl dithiophosphate + TWEEN ® 80 (3:1) | 2.1 + 0.7 | 3.6 | 17 | 7.9 | 36% | 56% | 64% |
| 2I-2 | #3 | ~75 | Sodium diisobutyl dithiophosphate + TWEEN ® 80 (3:1) | 2.1 + 0.7 | 3.9 | 11 | 7.5 | 30% | 72% | 66% |
| 2J | #3 | ~75 | ATLAS G-1086[d] | 5 | 5.1 | 36 | 19 | 9% | 8% | 14% |
| 2K-1 | #3 | ~75 | Sodium diisobutyl dithiophosphate + ATLAS G-1086 (3:1) | 2.1 + 0.7 | 0.5 | 0.4 | 0.2 | 91% | 99% | 99% |
| 2K-2 | #3 | ~75 | Sodium diisobutyl dithiophosphate + ATLAS G-1086 (3:1) | 2.1 + 0.7 | 3.1 | 1.1 | 0.6 | 45% | 97% | 97% |
| 2L | #4 | ~75 | Blank #4 | — | 5.1 | 35.4 | 19.1 | — | — | — |
| 2M-1 | #4 | ~75 | Sodium diisobutyl dithiophosphinate | 1.75 | 5.1 | 27.8 | 1 | 0% | 21% | 95% |
| 2M-2 | #4 | ~75 | Sodium diisobutyl dithiophosphinate + ATLAS G-1086 (93:7) | 1.67 + 0.167 | 2.4 | 0.5 | 0.3 | 53% | 99% | 98% |
| 2M-3 | #4 | ~75 | Sodium diisobutyl dithiophosphinate + ATLAS G-1086 (87:13) | 1.58 + 0.35 | 2.4 | 0.3 | 0.2 | 53% | 99% | 99% |

TABLE 2-continued

| Example | Plant phosphoric acid (~30% $P_2O_5$) | Temp. (° C.) | Reagents | Dosage (kg/T $P_2O_5$) | As (ppm) | Cd (ppm) | Pb (ppm) | Percentage of metal removed | | |
|---|---|---|---|---|---|---|---|---|---|---|
| | | | | | | | | As | Cd | Pb |
| 2M-4 | #4 | ~75 | Sodium diisobutyl dithiophosphinate + ATLAS G-1086 (81:19) | 1.5 + 0.5 | 2.4 | 0.6 | 0.3 | 53% | 98% | 98% |
| 2M-5 | #4 | ~75 | Sodium diisobutyl dithiophosphinate + ATLAS G-1086 (74:26) | 1.4 + 0.7 | 3.7 | 1.4 | 0.9 | 27% | 96% | 95% |
| 2M-6 | #4 | ~75 | Sodium diisobutyl dithiophosphinate + ATLAS G-1086 (68:32) | 1.31 + 0.88 | 3.7 | 3.4 | 3.5 | 27% | 90% | 82% |
| 2M-7 | #4 | ~75 | Sodium diisobutyl dithiophosphinate + ATLAS G-1086 (59:41) | 1.17 + 1.17 | 3.8 | 6.3 | 3.1 | 25% | 82% | 84% |
| 2M-8 | #4 | ~75 | Sodium diisobutyl dithiophosphinate + ATLAS G-1086 (42:48) | 0.88 + 1.75 | 4.7 | 20.7 | 1 | 8% | 42% | 95% |
| 2M-9 | #4 | ~75 | Sodium diisobutyl dithiophosphinate + ATLAS G-1086 (26:74) | 0.58 + 2.33 | 5 | 32.9 | 1.9 | 2% | 7% | 90% |
| 2M-10 | #4 | ~75 | ATLAS G-1086 | 3.5 | 4.8 | 33.4 | 17.7 | 6% | 6% | 7% |
| 2N | #5 | ~75 | Blank #5 | — | 10 | 2.3 | 1 | — | — | — |
| 2O-1 | #5 | ~75 | Sodium diisobutyl dithiophosphinate | 0.5 | 6.1 | 2.2 | 0.8 | 39% | 4% | 20% |
| 2O-2 | #5 | ~75 | | 1 | 3.9 | 1.7 | 0.7 | 61% | 26% | 30% |
| 2P-1 | #5 | ~75 | Sodium diisobutyl dithiophosphinate + Sodium Dioctylsulfosuccinate (4.3:1) | 0.43 + 0.1 | 5.4 | 1.5 | 0.6 | 46% | 35% | 40% |
| 2P-2 | #5 | ~75 | | 0.86 + 0.2 | 1.2 | 0.5 | 0.3 | 88% | 78% | 70% |

[a] obtained from Solvay S. A.;
[b] obtained from Sigma Aldrich;
[c,d] obtained from Croda Here again as shown in Table 2, while various surfactant compounds such as sodium dioctylsulfosuccinate, TWEEN® 80, and ATLAS™ G-1086 (Examples 2F-10, 2H, 2J, and 2M-10 respectively) show little or no efficacy of removing heavy metals from phosphoric acid or phosphoric acid slurry, and various organothiophosphorus compounds (Examples 2B-1; 2D-1; 2F-1; and 2G) show some performance, the removal of heavy metal from solutions containing phosphoric acid is greatly improved by adding a reagent according to the invention (Examples 2B-2; 2D-2; 2F-2 to 2F-9; 21-1 and 21-2; 2K-1 and 2K-2; 2M-2 to 2M-9; and 2P-1 and 2P-2) having at least one organothiophosphorus compound and at least one surfactant compound—even where the solution containing phosphoric acid is at an elevated temperature. Additionally, the dosage of reagents can be reduced and the process can be made more economical.

Unexpectedly, the selectivity of removal of certain metal, especially Cd and Cu, is shown to be greatly enhanced.

Example 3

Process for removing heavy metals from digestion phosphoric acid slurries (~30% $P_2O_5$) at ~60° C.). Calcium sulfate solid particles in the slurry act as adsorbents.

Phosphoric acid slurries are generated via bench-scale digestion of phosphate ore by using a 500 ml jacketed reactor connected with a thermal bath for keeping temperature at around 80° C. The reactor is also connected to a cooling condenser to avoid water evaporation during the digestion. Phosphoric acid and sulfuric acid are added continuously to the reactor through two peristaltic pumps (MasterFlex L/S). Phosphate rock/ore powder is manually added (roughly continuously) at a corresponding rate. The feed rate of sulfuric acid (52.4%) is 3.67 g/minute; feed rate of phosphoric acid (37.1%) is 7.67 g/minute; and phosphate ore powder is 2 g/minutes. The feeding time is around 30 minutes. After feeding acids and ores, the digestion is continued for an additional 2 to 3 hours to fully digest the phosphate ores. When reagents of interest and other additives (such as defoamer reagents) are used, effective amounts of reagents are first mixed with the aforementioned phosphoric acid and then continuously pumped into the reactor. During the whole process, the digestion slurry is stirred with an overhead stirrer (Glas-Col Precision Speed Controlled Stirrer) and a propeller-type impeller set at 300 rpm.

50 g of phosphoric acid slurry (~30% solid level, ~30% $P_2O_5$) post-digestion is transferred into a glass jar with a magnetic stir bar. The slurries contain a large amount (~30 wt. %) of solid particles, with the majority being calcium sulfate generated during the digestion of phosphate ore. An effective amount (as listed in Table 3) of a reagent of interest is dosed into the slurry under agitation at 600 rpm. After agitation for 2 minutes, the slurry is transferred to a vacuum filtration funnel (on a filtration setup with a 45 μm polypropylene net filter (Millipore PP4504700)) and the vacuum filtration starts immediately. The filtrate is collected and then submitted for ICP elemental analysis. The results are shown in Table 3 and plotted in FIG. 1.

TABLE 3

| Example | Reagents | Dosage (kg/T P$_2$O$_5$) | As (ppm) | Cd (ppm) | Cu (ppm) | Zn (ppm) | Percentage of metal removed As | Cd | Cu | Zn |
|---|---|---|---|---|---|---|---|---|---|---|
| 3A | Blank | — | 4.5 | 17 | 7.9 | 62.3 | — | — | — | — |
| 3B-1 | Sodium diisobutyl dithiophosphinate | 1 | 2.5 | 7.7 | 0.1 | 55.8 | 44% | 55% | 99% | 10% |
| 3B-2 | | | 2.4 | 9.5 | 0.1 | 54.4 | 47% | 44% | 99% | 13% |
| 3C-1 | Sodium diisobutyl dithiophosphinate + Sodium Dioctylsulfosuccinate (4.3:1) | 0.86 + 0.2 | 2.2 | 0.1 | 0.1 | 53.2 | 51% | 99% | 99% | 15% |
| 3C-2 | | | 1.6 | 0.1 | 0.1 | 54.8 | 64% | 99% | 99% | 12% |

The data in Table 3 also show the good performance of the reagents according to the invention for heavy metal removal from solutions containing phosphoric acid at elevated temperatures and with calcium sulfate solid particles in the slurry, which act as adsorbents. Again, reagents according to the invention having at least one organothiophosphorus compound and at least one surfactant compound show improved performance over those reagents containing only organothiophosphorus compounds.

The slurries contain a large amount (~30 wt. %) of solid particles, with the majority being calcium sulfates generated during the digestion of phosphate ores. In reference to FIG. 1, on the left are results from two repeated experiments dosed with sodium diisobutyl dithiophosphinate (Examples 3B-1 and 3B-2); and on the right are results from two repeated experiments dosed with the reagent according to the invention-sodium diisobutyl dithiophosphinate and sodium dioctylsulfosuccinate (Examples 3C-1 and 3C-2). Clearly, more Cd ions are removed with the organothiophosphorus compounds and dialkyl sulfosuccinates compounds than with organothiophosphorus compounds alone.

Example 4

Process for removing heavy metals from concentrated phosphoric acids (~56% P$_2$O$_5$) at elevated temperature (~45° C.).

60 g of plant phosphoric acid (~56% P$_2$O$_5$, concentrated from plant acid with ~44% P$_2$O$_5$) is transferred into a glass jar with a magnetic stir bar. An effective amount (as listed in Table 4) of a reagent of interest is dosed into slurry under agitation at 600 rpm. After agitation for 4 minutes, the acid is transferred into a syringe and filtered with a 0.2 μm nylon syringe filter. The filtrate is collected and then submitted for ICP elemental analysis. The results are shown in Table 4.

TABLE 4

| Example | Reagents | Dosage (kg/T P2O5) | As (ppm) | Cd (ppm) | Cu (ppm) | Percentage of metal removed As | Cd | Cu |
|---|---|---|---|---|---|---|---|---|
| 4A | Blank | — | 9.7 | 31 | 20 | — | — | — |
| 4B | Sodium Dioctylsulfosuccinate | 2.3 | 10 | 33 | 21 | −3% | −5% | −3% |
| 4C-1 | Sodium diisobutyl dithiophosphinate | 1.7 | 1.2 | 16 | 2.7 | 88% | 48% | 86% |
| 4C-2 | Sodium diisobutyl dithiophosphinate + Sodium Dioctylsulfosuccinate (4.3:1) | 1.4 + 0.33 | 2.1 | 6 | 6.5 | 78% | 81% | 67% |
| 4D-1 | Sodium diisobutyl dithiophosphate | 1.7 | 5.6 | 19 | 4.4 | 42% | 38% | 78% |
| 4D-2 | Sodium diisobutyl dithiophosphate + Sodium Dioctylsulfosuccinate (4.3:1) | 1.4 + 0.33 | 2.4 | 13 | 1.9 | 75% | 59% | 90% |
| 4E-1 | Sodium diisobutyl dithiophosphinate + Sodium diisobutyl dithiophosphate (1:1) | 0.83 + 0.83 | 4.5 | 22 | 5.4 | 54% | 30% | 73% |
| 4E-2 | Sodium diisobutyl dithiophosphinate + Sodium diisobutyl dithiophosphate + Sodium Dioctylsulfosuccinate (2.1:2.1:1) | 0.71 + 0.71 + 0.33 | 1.3 | 13 | 3.9 | 87% | 58% | 80% |

Again, as seen from the data in Table 4 while surfactant compounds such as sodium dioctylsulfosuccinate show little or no efficacy of removing heavy metals from phosphoric acid or phosphoric acid slurry (Example 4B), and organothiophosphorus compounds show some performance (Examples, 4C-1; 4D-1; and 4E-1), the removal of heavy metals is greatly improved by adding a reagent containing at least one organothiophosphorus compound and at least one surfactant such as sodium dioctylsulfosuccinate—even from solutions containing concentrated amounts of phosphoric acid at elevated temperatures.

Example 5

Process for removing heavy metals from phosphoric acids (~28% $P_2O_5$) at elevated temperature (~75° C.). Sodium hypophosphite used as reducing reagent.

35 g of plant phosphoric acid (~28% $P_2O_5$, collected from the clarification tank after filtration) is transferred into a glass jar with a magnetic stir bar. The acid is heated to 75° C. on a hot plate. An effective amount (as listed in Table 5) of a reagent of interest is then dosed into slurry under agitation at 600 rpm. After agitation for 1 minute, the acid is transferred into a syringe and filtered with a 0.2 μm nylon syringe filter. The filtrate is collected and then submitted for ICP elemental analysis. The results are shown in Table 5.

TABLE 5

| Example | Reagents | Dosage (kg/T $P_2O_5$) | As (ppm) | Cd (ppm) | Cu (ppm) | Percentage of metal removed | | |
|---|---|---|---|---|---|---|---|---|
| | | | | | | As | Cd | Cu |
| 5A | Blank | — | 4.7 | 34.4 | 17.3 | — | — | — |
| 5B | Sodium Dioctylsulfosuccinate | 3.5 | 4.7 | 35.6 | 17.8 | 0% | −3% | −3% |
| 5C-1 | Sodium diisobutyl dithiophosphinate | 2.5 | 4.9 | 21.6 | 4.9 | −4% | 37% | 72% |
| 5C-2 | Sodium diisobutyl dithiophosphinate + Sodium Dioctylsulfosuccinate (4.3:1) | 2.1 + 0.5 | 5 | 17.4 | 0.1 | −6% | 49% | 99% |
| 5D | Sodium hypophosphite | 5 | 4.9 | 36.1 | 18 | −4% | −5% | −4% |
| 5E-1 | Sodium hypophosphite + Sodium diisobutyl dithiophosphinate (1:2.5) | 0.67 + 1.7 | 5.2 | 26.2 | 8.1 | −11% | 24% | 53% |
| 5E-2 | Sodium hypophosphite + Sodium diisobutyl dithiophosphinate + Sodium Dioctylsulfosuccinate (1:2.1:0.5) | 0.67 + 1.4 + 0.33 | 4.4 | 17 | 0.4 | 6% | 51% | 98% |
| 5F-1 | Sodium hypophosphite + Sodium diisobutyl dithiophosphinate (1:2.5) | 1 + 2.5 | 4.6 | 18.2 | 3.1 | 2% | 47% | 82% |
| 5F-2 | Sodium hypophosphite + Sodium diisobutyl dithiophosphinate + Sodium Dioctylsulfosuccinate (1:2.1:0.5) | 1 + 2.1 + 0.5 | 4.3 | 13.3 | 0.2 | 9% | 61% | 99% |

As shown in Table 5, the efficacy of the reagent having an organothiophosphorus compound and a surfactant for heavy metal removal from solutions containing phosphoric acid can be improved further with the addition of sodium hypophosphite as a reducing agents. Compare Examples 5E-2 and 5F-2 with 5C-2

Various patent and/or scientific literature references have been referred to throughout this application. The disclosures of these publications in their entireties are hereby incorporated by reference as if written herein. In view of the above description and the examples, one of ordinary skill in the art will be able to practice the invention as claimed without undue experimentation.

Although the foregoing description has shown, described, and pointed out the fundamental novel features of certain embodiments of the present invention, it will be understood that various omissions, substitutions, and changes in the form of the detail of the invention as described may be made by those skilled in the art, without departing from the scope of the present teachings. Consequently, the scope of the present invention should not be limited to the foregoing description or discussion, but should be defined by the appended claims.

We claim:

1. A process for removing heavy metal ions from a phosphoric acid solution containing said heavy metal ions, said process comprising
    adding an effective amount of a reagent comprising an organothiophosphorus compound and a surfactant to the phosphoric acid solution to form heavy metal complexes, and
    separating the heavy metal complexes from the phosphoric acid solution.

2. A process according to claim 1, wherein said heavy metal ions are selected from the group consisting of cadmium, copper, arsenic, mercury, lead, and mixtures thereof.

3. A process according to claim 1, wherein said heavy metal ion is cadmium.

4. A process according to claim 1, wherein said organothiophosphorus compound is selected from the group consisting of organodithiophosphinic acid, organodithiophosphonic acid, organodithiophosphoric acid, organomonothiophosphinic acid, organomonothiophosphonic acid, organomonothiophosphoric acid, and their salts in the form of sodium, ammonium, or potassium, and mixtures thereof.

5. A process according to claim 4, wherein said organothiophosphorus compound comprises mixtures of organodithiophosphinic acid, organodithiophosphoric acid, and their salts in the form of sodium, ammonium, or potassium.

6. A process according to claim 4, wherein said organodithiophosphinic compound is sodium diisobutyl dithiophosphinate.

7. A process according to claim 4, wherein said organodithiophosphoric compound is sodium diisobutyl dithiophosphate.

8. A process according to claim 1, wherein said surfactant is selected from the group consisting of sulfosuccinates, arylsulfonates, alkyarylsulfonates, diphenyl sulfonates, olefin sulfonates, sulfonates of ethoxylated alcohols, petroleum sulfonates, sulfosuccinamates, alkoxylated surfactants, ester/amide surfactants, EO/PO block copolymers, and mixtures thereof.

9. A process according to claim 8, wherein said surfactant is a sulfosuccinate.

10. A process according to claim 9, wherein said sulfosuccinate compound is sodium dioctylsulfosuccinate.

11. A process according to claim 8, wherein the surfactant is polyethyleneglycol ester.

12. A process according to claim 11, wherein the polyethyleneglycol ester surfactant is chosen from polyethyleneglycol sorbitan monooleate or polyethyleneglycol sorbitol hexaoleate.

13. A process according to claim 1, wherein the process is performed at a temperature from 0° C. to 120° C.

14. A process according to claim 1, wherein the phosphoric acid solution has a concentration from 20% to 64% $P_2O_5$, and the process is performed at a temperature from 20° C. to 80° C.

15. A process according to claim 1 further comprising adding an effective amount of a reducing agent to the phosphoric acid solution.

16. A process according to claim 15, wherein said reducing agent is added prior to or together with the addition of the reagent.

17. A process according to claim 15, wherein said reducing agent is selected from the group consisting of sodium hypophosphite, hydrazine, iron (II) sulfate, iron powder, and mixtures thereof.

18. A process according to claim 17, wherein said reducing agent is sodium hypophosphite.

19. A process according to claim 1 further comprising adding an effective amount of an adsorbent to the phosphoric acid solution.

20. A process according to claim 19, wherein said adsorbent is selected from the group consisting of calcium sulfate, fluorosilicate, activated carbon, and mixtures thereof.

21. A process according to claim 20, wherein said adsorbent is calcium sulfate particles.

22. A process according to claim 1, wherein the process further comprises the step of filtering the phosphoric acid solution prior to adding the reagent.

* * * * *